(12) United States Patent
Kawanabe

(10) Patent No.: US 11,624,891 B2
(45) Date of Patent: *Apr. 11, 2023

(54) LENS GUIDE DEVICE, LENS MOVING DEVICE, AND IMAGING APPARATUS

(71) Applicant: FUJIFILM Corporation, Tokyo (JP)

(72) Inventor: Yuichi Kawanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 765 days.

This patent is subject to a terminal disclaimer.

(21) Appl. No.: 16/419,618

(22) Filed: May 22, 2019

(65) Prior Publication Data
US 2019/0271825 A1   Sep. 5, 2019

Related U.S. Application Data

(63) Continuation of application No. PCT/JP2017/038904, filed on Oct. 27, 2017.

(30) Foreign Application Priority Data

Dec. 5, 2016  (JP) .............................. JP2016-235940

(51) Int. Cl.
*G02B 7/00* (2021.01)
*G02B 13/00* (2006.01)
(Continued)

(52) U.S. Cl.
CPC ............. *G02B 7/023* (2013.01); *G02B 7/022* (2013.01); *G02B 7/04* (2013.01); *H04N 5/2254* (2013.01)

(58) Field of Classification Search
CPC ........ G02B 7/10; G02B 15/173; G02B 7/005; G02B 7/102; G02B 7/02; G02B 25/002;
(Continued)

(56) References Cited

U.S. PATENT DOCUMENTS 5,432,772 A * 7/1995 Yamamoto ......... G11B 7/08582
6,201,650 B1   3/2001 Jonas et al.
(Continued)

FOREIGN PATENT DOCUMENTS

CN   101156101 A   4/2008
CN   101672966 A   3/2010
(Continued)

OTHER PUBLICATIONS

Chinese Office Action and Search Report for corresponding Chinese Application No. 201780075363.3, dated Nov. 19, 2020, with English translation of the Office Action.
(Continued)

*Primary Examiner* — Dawayne Pinkney
(74) *Attorney, Agent, or Firm* — Birch, Stewart, Kolasch & Birch, LLP

(57) ABSTRACT

There are provided a lens guide device, a lens moving device, and an imaging apparatus that can accurately position a lens frame regardless of an attitude, such as an imaging direction. A first-rail supports a first-rolling-body so as to allow the first-rolling-body to be rollable in a first-direction parallel to an optical-axis of a first-focus-lens. A second-rail supports a second-rolling-body so as to allow the second-rolling-body to be rollable in the first-direction. A biasing-mechanism supports the first-rolling-body so as to allow the first-rolling-body to be movable in the first-direction, and biases the first-rolling-body toward the first-rail. A third-rail is provided in parallel with the second-rail. The third-rail supports the second-rolling-body so as to allow the second-rolling-body to be movable in the first-direction. Since the first-rail and the second-rail are moved and guided in a first direction by the first-rolling-body and the second-rolling-body, a lens frame is not inclined.

8 Claims, 15 Drawing Sheets

(51) Int. Cl.
    *G02B 7/28*     (2021.01)
    *A61B 1/00*     (2006.01)
    *G02B 7/02*     (2021.01)
    *H04N 5/225*    (2006.01)
    *G02B 7/04*     (2021.01)

(58) Field of Classification Search
    CPC ........ G02B 7/021; G02B 23/125; G02B 7/14;
                G02B 7/023; G02B 5/06; G02B 7/04;
                G02B 7/08; G02B 7/026; G03B 17/14;
                H04N 5/23296
    USPC ................ 359/703, 704, 676, 694, 808, 811,
                359/813–815, 819, 821–830, 696;
                396/76, 79; 348/240.99–240.3
    See application file for complete search history.

(56) References Cited

U.S. PATENT DOCUMENTS

| | | | |
|---|---|---|---|
| 2009/0046198 A1* | 2/2009 | Iwasaki | G02B 13/009 |
| | | | 348/347 |
| 2009/0067069 A1 | 3/2009 | Matsumoto | |
| 2010/0046101 A1 | 2/2010 | Nakamura | |
| 2010/0067129 A1 | 3/2010 | Ozaki et al. | |
| 2010/0091391 A1 | 4/2010 | Schwab | |
| 2012/0237147 A1 | 9/2012 | Utz | |
| 2014/0168793 A1 | 6/2014 | Fukino | |
| 2015/0309388 A1 | 10/2015 | Sato | |

FOREIGN PATENT DOCUMENTS

| | | | | |
|---|---|---|---|---|
| CN | 103597394 A | | 2/2014 | |
| CN | 107924064 A | * | 4/2018 | ........... G02B 27/646 |
| JP | 8-29656 A | | 2/1996 | |
| JP | 8-86949 A | | 4/1996 | |
| JP | 11-133283 A | | 5/1999 | |
| JP | 2002-502987 A | | 1/2002 | |
| JP | 2007-271889 A | | 10/2007 | |
| JP | 2008-233385 A | | 10/2008 | |
| JP | 2010-521009 A | | 6/2010 | |
| JP | 2012-78717 A | | 4/2012 | |
| JP | 2013-54189 A | | 3/2013 | |
| JP | 2014-48319 A | | 3/2014 | |
| JP | 2015-81992 A | | 4/2015 | |
| JP | 2015-210409 A | | 11/2015 | |

OTHER PUBLICATIONS

Chinese Office Action for corresponding Chinese Application No. 201780075363.3, dated Jun. 9, 2021, with English translation of the Office Action.

International Preliminary Report on Patentability and Written Opinion of the International Searching Authority (Forms PCT/IB/326, PCT/IB/373, and PCT/ISA/237) for International Application No. PCT/JP2017/038904, dated Jun. 20, 2019, with English translation.

International Search Report (Form PCT/ISA/210) for International Application No. PCT/JP2017/038904, dated Jan. 23, 2018, with English translation.

* cited by examiner

LENS GUIDE DEVICE, LENS MOVING DEVICE, AND IMAGING APPARATUS

CROSS-REFERENCE TO RELATED APPLICATIONS

This application is a Continuation of PCT International Application No. PCT/JP2017/038904 filed on Oct. 27, 2017, which claims priority under 35 U.S.C § 119(a) to Japanese Patent Application No. 2016-235940 filed on Dec. 5, 2016. Each of the above application(s) is hereby expressly incorporated by reference, in its entirety, into the present application.

BACKGROUND OF THE INVENTION

1. Field of the Invention

The present invention relates to a lens guide device, a lens moving device, and an imaging apparatus.

2. Description of the Related Art

A lens moving device, which moves a lens group at the time of an operation for changing a magnification or a focusing operation, is mounted on an imaging apparatus, such as a digital camera, or an optical device, such as a lens barrel (for example, see JP2015-210409A and JP1996-086949A (JP-H08-086949A)).

In a lens moving device disclosed in JP2015-210409A, a lens frame 101 is held by a pair of first and second guide members 102 and 103 parallel with each other as shown in FIG. 16. Further, the lens frame 101 is moved in the longitudinal direction of these guide members 102 and 103 to change the position of a lens 106 in an optical axis direction and to perform an operation for changing a magnification or a focusing operation. In this case, the lens frame 101 is biased toward one guide member, for example, the second guide member 103 by, for example, a coil spring (not shown) so that the lens frame 101 is guided by the guide members 102 and 103 without rattling.

Since the rolling of balls is used to move an optical holding member in an optical axis direction in an optical device disclosed in JP1996-086949A (JP-H08-086949A), the oscillation of a lens, which is being moved, is suppressed.

SUMMARY OF THE INVENTION

As shown in (A) of FIG. 16, the lens frame 101 in the related art includes a guide barrel 105. The guide barrel 105 includes a guide hole 105A, and the first guide member 102 is inserted into the guide hole 105A. A gap G1 is formed between the guide hole 105A and the first guide member 102 to smoothly move the lens frame 101 by the first guide member 102.

The gap G1 can secure the smooth movement of the lens frame 101, but the lens frame 101 is inclined in the range of the gap G1. For this reason, there is a problem that the position of the held lens 106 in the optical axis direction is shifted as shown in (B) of FIG. 16 in a case where the lens frame 101, which is being moved, is to be stopped on the basis of the detection signal of a sensor detecting the position of the lens frame 101. For example, the inclination of the lens frame 101 in a state immediately after movement/stop shown in (B) is different from that in a subsequent stop state shown in (A) due to the gap G1 of the lens frame 101. Due to this inclination, the position of the held lens 106 in the optical axis direction is shifted by the amount PS of shift.

In the lens moving device disclosed in JP2015-210409A, the coil spring is used to bias the lens frame 101 in a direction orthogonal to the guide members 102 and 103 to remove rattling. However, the sliding resistance of the lens frame 101 during movement is increased as much as the rattling is removed. For this reason, there is a problem that a lens driving device is increased in size since a driving force required to move the lens frame 101 is increased. Further, even though the lens frame 101 is biased by the coil spring, an inclination between the time of movement of the lens frame 101 and the time of stop of the lens frame 101 cannot be completely removed. For this reason, there is a problem that a shift in the position of the lens in the optical axis direction remains.

In an optical device disclosed in JP1996-086949A (JP-H08-086949A), balls are provided between a lens frame and a guide member and the lens frame is movably held by a rolling of the balls. Accordingly, an inclination at the time of movement and stop of the lens frame is removed. However, since the balls are disposed on both sides of an optical axis, a guide mechanism using the balls is increased in size. For this reason, it is difficult to make the entire device compact. Further, since an effect caused by rolling is not obtained in a case where the positions of a lens and the balls are vertically inverted, the lens cannot be smoothly guided. Accordingly, there is a problem that the lens cannot be smoothly moved due to a difference in attitude in a case where imaging is performed in various modes where the direction of an imaging apparatus varies.

The invention provides a lens guide device, a lens moving device, and an imaging apparatus that can remove the inclination of a lens frame at the time of movement and stop and can accurately position the lens frame even though an attitude, such as an imaging direction, is changed.

A lens guide device of the invention includes: a lens frame that holds a lens; a first guide member; a first rolling body; a second guide member; a second rolling body; a third guide member; a fourth guide member; and a biasing mechanism. The first guide member is provided on the lens frame in a first direction parallel to an optical axis of the lens. The first rolling body is moved while being in contact with the first guide member. The second guide member is parallel to the first guide member and is provided on the lens frame on a side opposite to the first rolling body so as to be close to the first guide member. The second rolling body is moved while being in contact with the second guide member. The third guide member supports the second rolling body so as to allow the second rolling body to be movable in the first direction and is provided in parallel with the second guide member. The fourth guide member supports the first rolling body so as to allow the first rolling body to be movable in the first direction and is provided in parallel with the first guide member. The biasing mechanism biases one of the first and second rolling bodies toward the other of the first and second rolling bodies.

It is preferable that at least one of the first guide member, the second guide member, the third guide member, or the fourth guide member is a flat plate-like guide member or a guide member with a guide groove and each of the other guide members is two parallel guide shafts.

One of the first rolling body and the second rolling body may be two spheres that are provided so as to be spaced from each other in the first direction, and the other of the first rolling body and the second rolling body may be one sphere that is provided between the two spheres when the first rolling body and the second rolling body are viewed in a second direction that is a direction which is orthogonal to the first direction and in which the first guide member and the second guide member are arranged. Further, it is preferable that the first rolling body is at least one sphere, the second rolling body is two spheres, and the lens guide device further comprises a first restricting protrusion and a second restricting protrusion. The first restricting protrusion restricts the movement of the first rolling body beyond a predetermined range on the first guide member. The second restricting protrusion is provided between the two spheres and restricts the movement of the second rolling body beyond a predetermined range on the second guide member.

It is preferable that each of the first rolling body and the second rolling body is two spheres that are provided so as to be spaced from each other in the first direction and the lens guide device further comprises restricting protrusions between the two spheres, respectively. The restricting protrusions protrude from intermediate positions of the first and second guide members in the first direction, and restrict the movement of the respective spheres beyond predetermined ranges in the first direction.

It is preferable that the lens guide device further comprises a holding barrel, a guide rod, and a guide groove. The biasing mechanism and the third guide member are provided in the holding barrel, and the holding barrel holds the lens frame therein. The guide rod is provided in the holding barrel in the first direction. The guide groove is provided on the lens frame, is in sliding contact with the guide rod, and guides the lens frame so as to allow the lens frame to be movable in the first direction.

It is preferable that the first rolling body is provided so as to be eccentric to the guide rod or a side opposite to the guide rod from the second rolling body.

It is preferable that the lens guide device further comprises a holding barrel, a fifth guide member, a third rolling body, and a support member. The biasing mechanism and the third guide member are provided in the holding barrel and the holding barrel holds the lens frame therein. The fifth guide member is provided on the lens frame in the first direction. The third rolling body is moved in the first direction while being in contact with the fifth guide member. The support member supports the third rolling body so as to allow the third rolling body to be movable in the first direction, is parallel to the fifth guide member, and is provided in the holding barrel. Further, it is preferable that the first rolling body is provided so as to be eccentric to the fifth guide member or a side opposite to the fifth guide member from the second rolling body.

A lens moving device of the invention comprises the lens guide device and a lens driving mechanism. The lens driving mechanism is provided in the holding barrel and moves the lens frame in an optical axis direction. It is preferable that the lens driving mechanism is a voice coil motor or a stepping motor that includes a screw rod screwed with the lens frame. Further, it is preferable that the lens driving mechanism performs initialization for returning the lens frame to a reference position that is one end of the predetermined range.

An imaging apparatus of the invention comprises an imaging unit and the lens moving device that forms an object image on the imaging unit.

According to the invention, it is possible to remove the inclination of a lens frame at the time of movement and stop and to accurately position the lens frame even though an attitude, such as an imaging direction, is changed.

DESCRIPTION OF THE PREFERRED EMBODIMENTS

Figure 1:
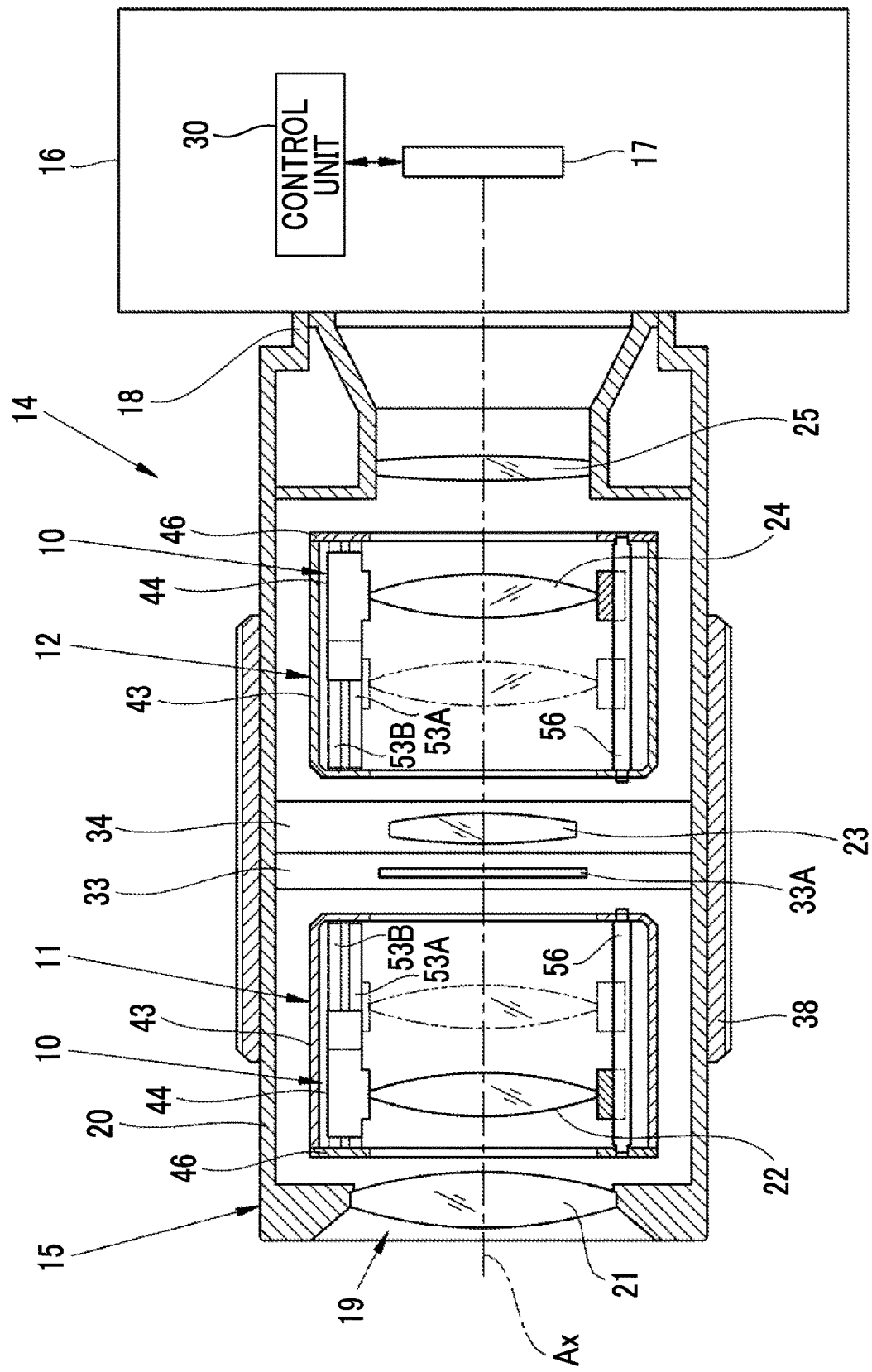
FIG. 1 is a cross-sectional view showing the schematic structure of an imaging apparatus according to an embodiment of the invention.

As shown in FIG. 1, an imaging apparatus 14 using lens guide devices 10 and lens moving devices 11 and 12 according to embodiments of the invention includes a lens unit 15 and a camera body 16 as an imaging unit. The lens unit 15 is formed as an interchangeable lens unit, and forms an object image on an imaging element 17 provided in the camera body 16. The lens unit 15 includes a connector 18 that is attachable to and detachable from the camera body 16. The lens unit 15 may be integrated with the camera body 16.

The lens unit 15 comprises an optical system 19 in a lens barrel member 20. The optical system 19 includes, for example, first to fifth lenses 21 to 25 that are provided in this order from an object side along an optical axis Ax. Each of the first to fifth lenses 21 to 25 is schematically shown as one lens, but may be a plurality of lens groups.

The camera body 16 comprises the imaging element 17 that takes an optical image of an object obtained through the optical system 19. A control unit 30 inputs information about various imaging conditions, such as an imaging timing, to the imaging element 17, and receives image signals that are taken by and output from the imaging element 17. Then, the control unit 30 performs analog processing and digital processing on the received image signals and generates taken image data to be output.

A first lens moving device 11 as a first focus mechanism, a stop mechanism 33, a vibration-proof mechanism 34, and a second lens moving device 12 as a second focus mechanism are provided in the lens barrel member 20 in this order from the object side.

A focus ring 38 is rotatably mounted on the outer periphery of the lens barrel member 20. In a case in which focusing is manually performed, for example, a first focus lens 22 as the second lens and a second focus lens 24 as the fourth lens are individually moved in a first direction parallel to the optical axis Ax according to the rotation of the focus ring 38 when the focus ring 38 is rotated. The first focus lens 22 and the second focus lens 24 are provided at predetermined positions corresponding to imaging distances on the optical axis by this movement of the first focus lens 22 and the second focus lens 24, so that focusing is completed.

The first lens 21 and the fifth lens 25 are mounted on the lens barrel member 20. The first lens 21 is fixed to the front end portion (object side) of the lens barrel member 20. Further, the fifth lens 25 is fixed to the rear end portion (imaging element side) of the lens barrel member 20. The first focus lens 22 as the second lens, a blur-correction lens 23 as the third lens, and the second focus lens 24 as the fourth lens are movable lenses.

The first focus lens 22 is driven by the first lens moving device 11 and is moved in the direction of the optical axis Ax (optical axis direction). The second focus lens 24 is driven by the second lens moving device 12 and is moved in the optical axis direction.

Figure 2:
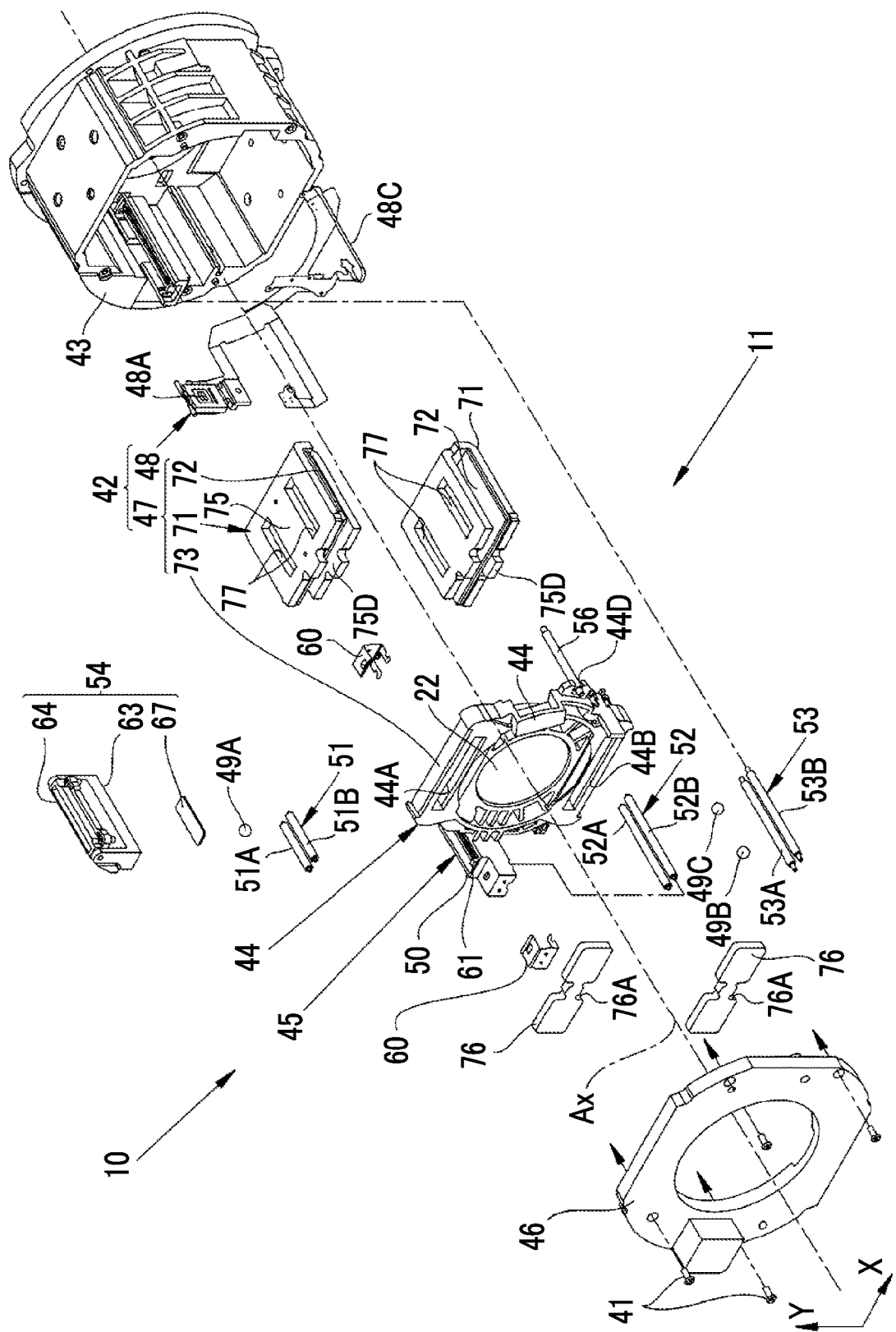
FIG. 2 is a detailed exploded perspective view of a lens moving device according to the embodiment of the invention.
Figure 3:
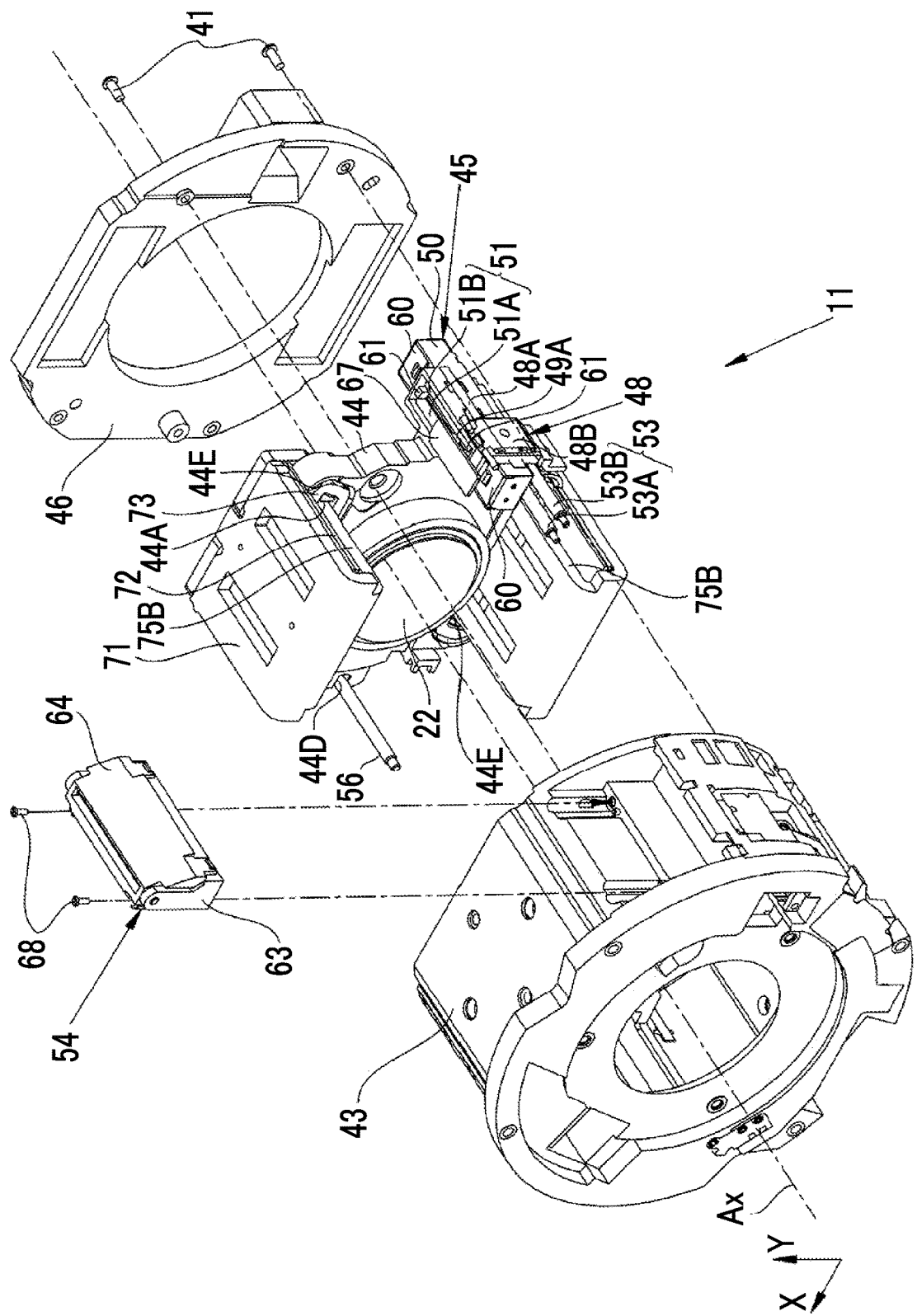
FIG. 3 is a rough exploded perspective view of the lens moving device according to the embodiment of the invention.

As shown in FIGS. 2 and 3, the first lens moving device 11 comprises a lens guide device 10 and a lens driving mechanism 42. The lens guide device 10 includes a cylindrical holding barrel 43, a lens frame 44, a guide mechanism 45, a base plate 46, and mounting screws 41. The lens driving mechanism 42 includes a pair of voice coil motors (VCMs) 47 and a position sensor 48 for focusing.

The first focus lens 22 is mounted on the lens frame 44. The lens frame 44 is held in the holding barrel 43 by the guide mechanism 45. The guide mechanism 45 guides the lens frame 44 so as to allow the lens frame 44 to be movable in the optical axis direction of the first focus lens 22. For the convenience of description, for example, a horizontal direction is referred to as an X direction and a vertical direction is referred to as a Y direction as shown in FIG. 2 when a plane orthogonal to the optical axis direction is viewed in the optical axis direction. Further, the plane orthogonal to the optical axis direction is referred to as an XY plane.

The guide mechanism 45 comprises: rolling bodies 49A, 49B, and 49C; a guide frame 50; a first rail 51 as a first guide member; a second rail 52 as a second guide member; a third rail 53 as a third guide member; a biasing mechanism 54 including a biasing plate 67 as a fourth guide member; and a guide rod 56. The rolling bodies 49A to 49C are formed of spheres that are made of metal or ceramic.

As shown in FIG. 2, the guide frame 50 is formed on the left side of the lens frame 44 and a guide groove 44D is formed on the right side of the lens frame 44 when the lens frame 44 is viewed from the base plate 46 in the optical axis direction. The guide rod 56 is inserted into the guide groove 44D. The guide rod 56 is provided between the front surface of the holding barrel 43 and the base plate 46 in parallel with the optical axis Ax. The guide groove 44D is in sliding contact with the guide rod 56, and guides the lens frame 44 so as to allow the lens frame 44 to be movable in the first direction.

As shown in FIG. 3, the guide frame 50 is provided on the side opposite to the guide rod 56 with respect to the optical axis Ax in a diameter direction orthogonal to the optical axis Ax. The guide frame 50 is formed substantially in the shape of a rectangular parallelepiped, and is formed to extend in the direction of the optical axis Ax.

Figure 4:
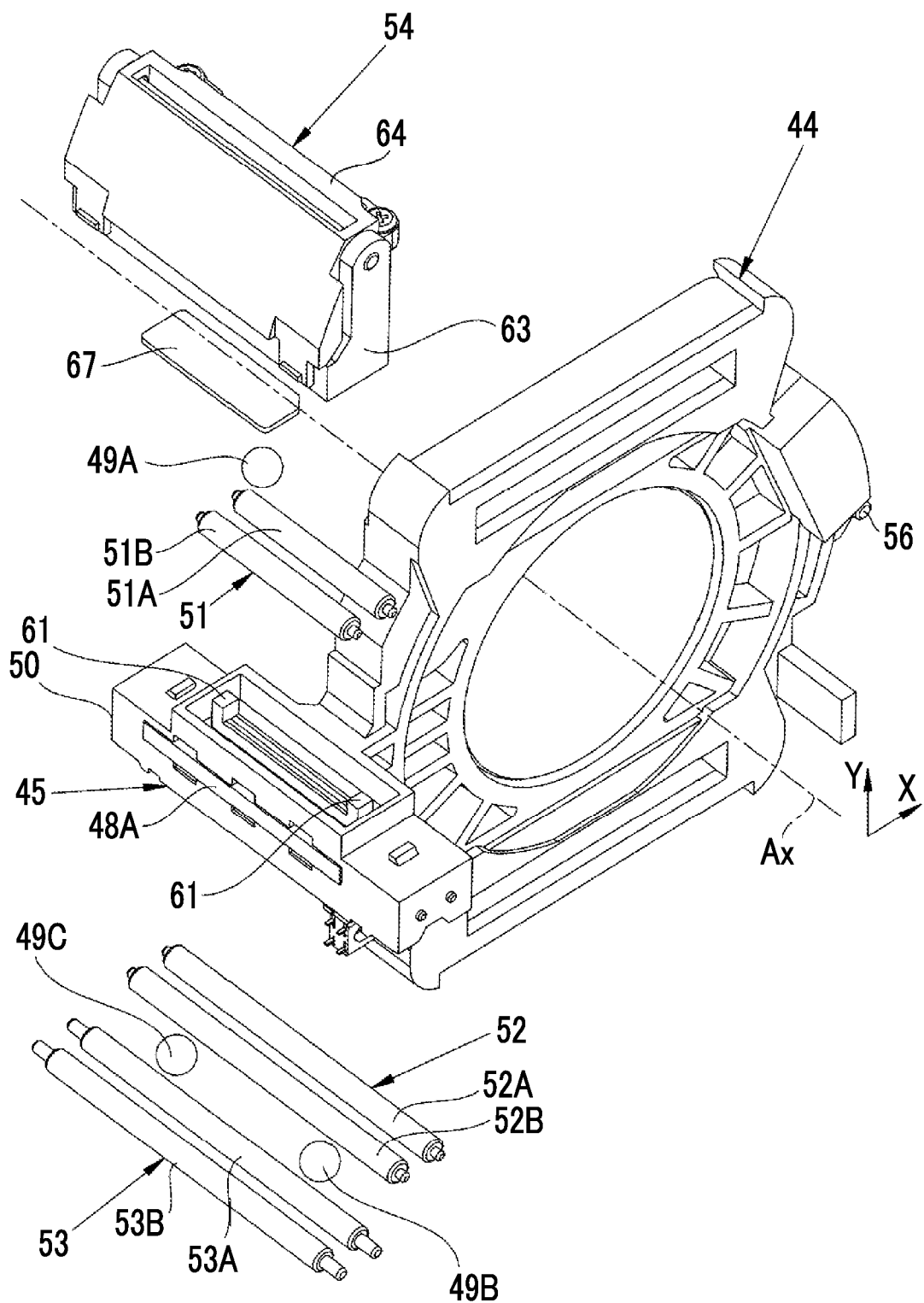
FIG. 4 is a vertical exploded perspective view of a lens guide device according to the embodiment of the invention.
Figure 5:
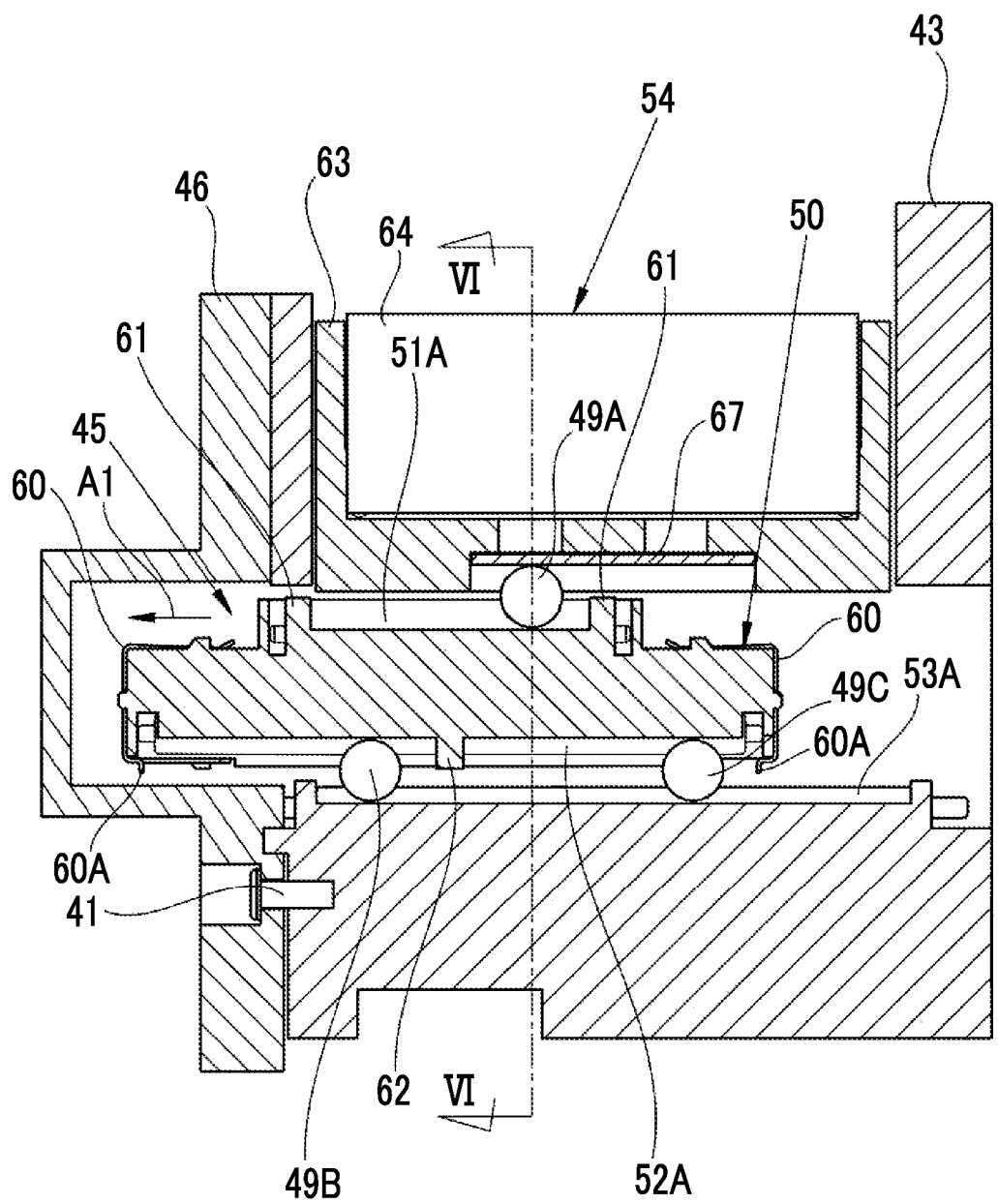
FIG. 5 is a cross-sectional view of the lens guide device.
Figure 6:
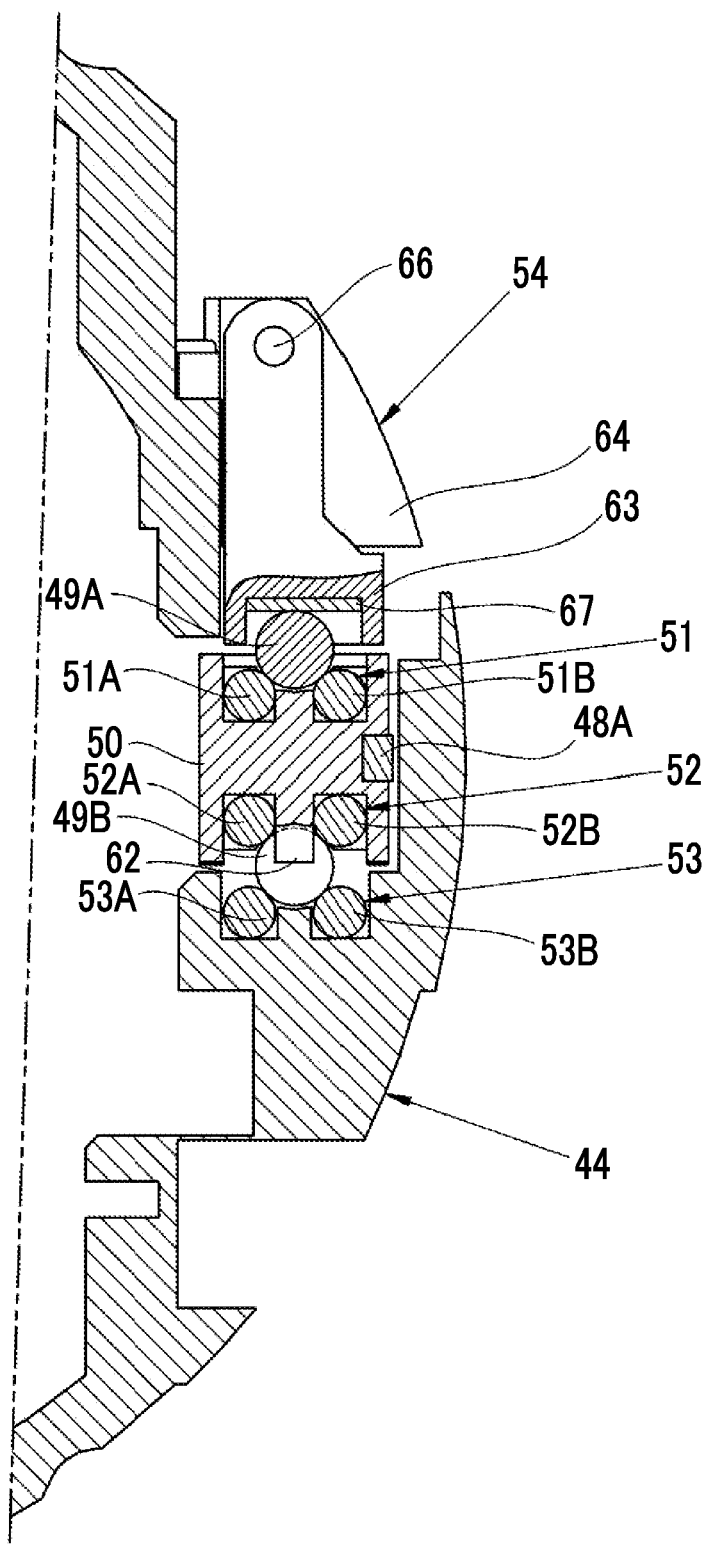
FIG. 6 is a cross-sectional view taken along line VI-VI of FIG. 5.

When the lens frame 44 is viewed from the base plate 46 (see FIG. 2) in the optical axis direction, the first rail 51 is housed in the upper portion of the guide frame 50 in parallel with the optical axis direction and the second rail 52 is housed in the lower portion of the guide frame 50 in parallel with the optical axis direction as shown in FIGS. 4 to 6. The first rolling body 49A is placed on the first rail 51. The first rolling body 49A is formed of one sphere made of metal or ceramic, and rolls along the first rail 51. The second rail 52 is parallel to the first rail 51 and is provided on the lens frame 44 on the side opposite to the first rolling body 49A so as to be close to the first rail 51.

The biasing mechanism 54 is provided over the first rolling body 49A in parallel to the first rail 51. The biasing mechanism 54 is screwed in the holding barrel 43, supports the first rolling body 49A so as to allow the first rolling body 49A to be movable in the first direction, and biases the first rolling body 49A in a second direction toward the first rail 51. The second direction is a vertical direction which is orthogonal to the first direction and in which the first rail 51 and the second rail 52 are arranged.

Figure 7:
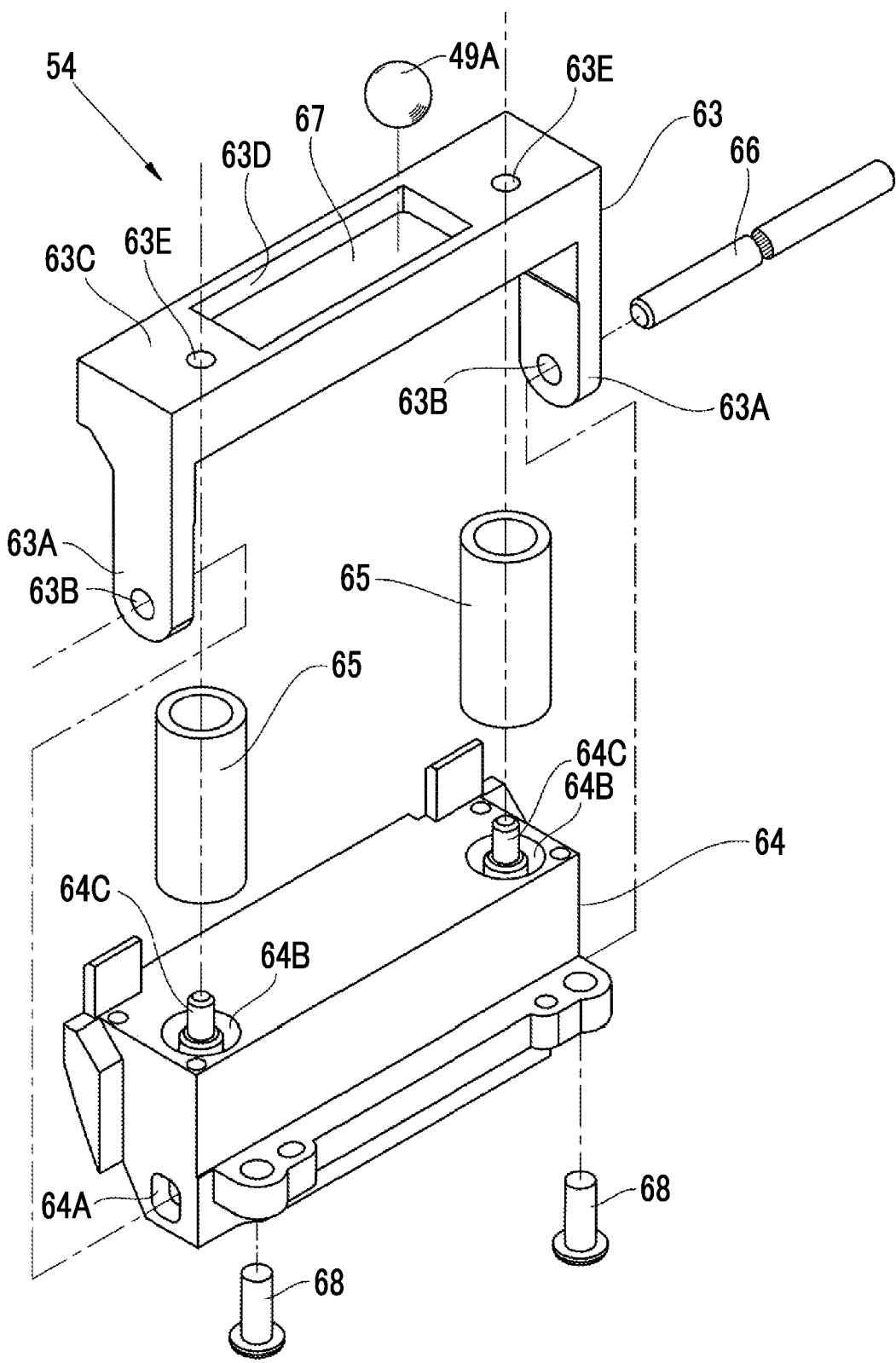
FIG. 7 is a vertical exploded perspective view of a biasing mechanism that is vertically inverted.

As shown in FIG. 7, the biasing mechanism 54 includes a biasing frame 63, a mounting frame 64, a pair of coil springs 65, a mounting shaft 66, and mounting screws 68. The biasing mechanism 54 biases the biasing plate (flat plate-like guide member) 67 as the fourth guide member toward the first rolling body 49A. The biasing frame 63 is held on the mounting frame 64 through the mounting shaft 66 so as to be movable in the vertical direction. The mounting shaft 66 is inserted into mounting holes 63B that are provided in mounting pieces 63A of the biasing frame 63. A long hole 64A, which is long in the vertical direction, is formed in the mounting frame 64. The mounting shaft 66 is inserted into the long hole 64A.

A housing groove 63D for the first rolling body 49A is formed on a lower surface 63C of the biasing frame 63 (FIG. 7 shows a state when the biasing mechanism 54 is viewed from the bottom and the biasing mechanism 54 is vertically inverted). The housing groove 63D has a rectangular shape, and is formed to extend in the first direction so as to correspond to the first rail 51 (see FIG. 2). The biasing plate 67 made of metal is provided in the housing groove 63D. The biasing plate 67 is in contact with the first rolling body 49A.

To bias the biasing frame 63 downward, a pair of spring-housing holes 64B is formed in the mounting frame 64. Guide shafts 64C are provided in the spring-housing holes 64B, respectively. The coil springs 65 are housed in the spring-housing holes 64B and the guide shafts 64C are inserted into the coil springs 65, respectively. The distal ends of the guide shafts 64C are fitted to guide holes 63E of the biasing frame 63, respectively.

As shown in FIG. 4, second rolling bodies 49B and 49C are in contact with the lower portion of the second rail 52.

The second rolling bodies 49B and 49C are placed on the third rail 53 and roll on the third rail 53.

The first rail 51 is formed of two guide shafts 51A and 51B that are made of metal and are arranged in the horizontal direction. Likewise, the second rail 52 is also formed of two guide shafts 52A and 52B that are made of metal and are arranged in the horizontal direction, and the third rail 53 is also formed of two guide shafts 53A and 53B that are made of metal and are arranged in the horizontal direction. The pair of guide shafts 51A and 51B, the pair of guide shafts 52A and 52B, and the pair of guide shafts 53A and 53B are spaced from each other with an interval therebetween so that the first rolling body 49A and the second rolling bodies 49B and 49C are not separated.

As shown in FIGS. 2 and 3, stoppers 60 made of metal are mounted on both end portions of the guide frame 50 in the first direction. The stoppers 60 are bent in a U shape, and prevent the second rolling bodies 49B and 49C from being separated from the guide frame 50.

As shown in FIGS. 3 to 5, a pair of first restricting protrusions 61 is formed so as to protrude upward from a gap between the respective guide shafts 51A and 51B of the first rail 51. The first restricting protrusions 61 restrict the rolling of the first rolling body 49A beyond a predetermined range on the first rail 51.

Figure 8:
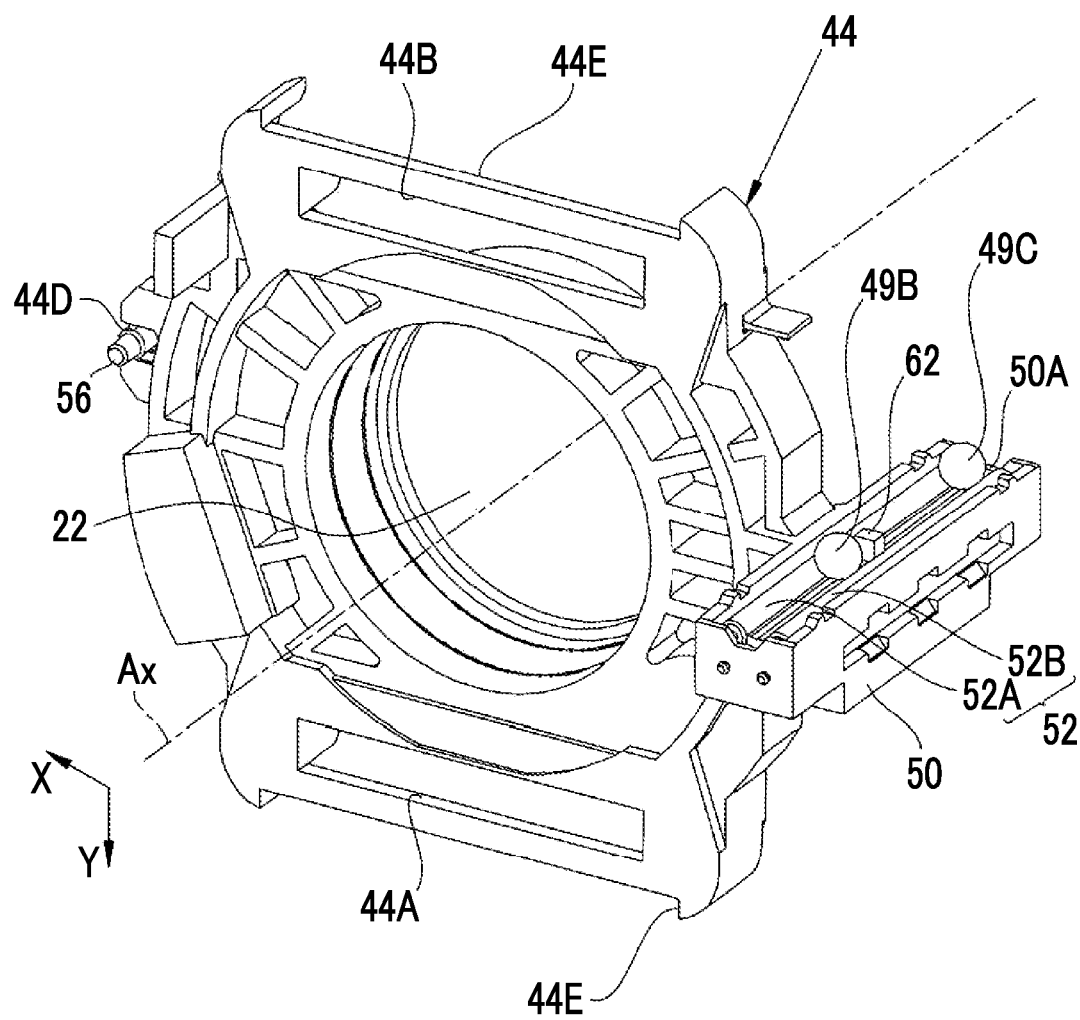
FIG. 8 is a perspective view of a second restricting protrusion.

FIG. 8 is a perspective view of the second rolling bodies 49B and 49C and a second restricting protrusion 62 on the second rail 52 that is viewed from the bottom. One second restricting protrusion 62 is formed so as to protrude upward (actually downward) from a gap between the respective guide shafts 52A and 52B of the second rail 52. The second restricting protrusion 62 is positioned in the middle portion of the second rail 52 in the first direction. The second restricting protrusion 62 restricts the rolling of the second rolling bodies 49B and 49C beyond a predetermined range on the second rail 52.

The first restricting protrusions 61 and the second restricting protrusion 62 return the respective rolling bodies 49A to 49C to reference positions. For example, the rolling position of the first rolling body 49A on the first rail 51 and the rolling positions of the second rolling bodies 49B and 49C on the second rail 52 may be shifted due to fall, other impacts, or the like. In this case, when the lens frame 44 returns to the reference position (for example, a first end close to the object side) as shown in FIG. 5 by an arrow A1, one first restricting protrusion 61 pushes the first rolling body 49A and returns the first rolling body 49A to the reference position. Further, when the lens frame 44 returns to the reference position, the second restricting protrusion 62 pushes one of the second rolling bodies 49B and 49C and returns one second rolling body 49B to the reference position. Likewise, when the lens frame 44 returns to the reference position, a protruding end portion 60A of the stopper 60 of the guide frame 50 pushes the other of the second rolling bodies 49B and 49C and returns the other second rolling body 49C to the reference position likewise. The protruding end portion 60A also functions as a restricting protrusion. In a case where the moving distance of the lens frame 44 is denoted by S, the moving distance of the first rolling body 49A, which is moved while rolling, can be calculated from Expression 1 to be described below.

$$S[1/\{1+\cos(\theta_1/2)\}]$$  (Expression 1)

Likewise, the moving distances of the second rolling bodies 49B and 49C can be calculated from Expression 2 to be described below.

$$S[\cos(\theta_3/2)/\{\cos(\theta_3/2)+\cos(\theta_2/2)\}]$$  (Expression 2)

Here, an angle formed between a straight line that passes through a contact point between the first rolling body 49A and the guide shaft 51A and the center of the first rolling body 49A and a straight line that passes through a contact point between the first rolling body 49A and the guide shaft 51B and the center of the first rolling body 49A, when the first rolling body 49A and the guide shafts 51A and 51B are viewed in the optical axis direction, is denoted by $\theta_1$. Further, an angle formed between a straight line that passes through a contact point between the second rolling body 49B and the guide shaft 52A and the center of the second rolling body 49B and a straight line that passes through a contact point between the second rolling body 49B and the guide shaft 52B and the center of the second rolling body 49B, when the second rolling body 49B and the guide shafts 52A and 52B are viewed in the optical axis direction, is denoted by $\theta_2$. Furthermore, an angle formed between a straight line that passes through a contact point between the second rolling body 49B and the guide shaft 53A and the center of the second rolling body 49B and a straight line that passes through a contact point between the second rolling body 49B and the guide shaft 53B and the center of the second rolling body 49B, when the second rolling body 49B and the guide shafts 53A and 53B are viewed in the optical axis direction, is denoted by $\theta_3$.

Since the manufacturing errors of parts and the like also need to be actually considered, the approximate value obtained from Expression 1 or Expression 2 is in the above-mentioned predetermined range. In a case where the predetermined range is unnecessarily large, the function of the restricting protrusion to return the rolling body to the reference position is not fulfilled.

Openings 44A and 44B where the VCMs 47 are to be mounted are formed at upper and lower portions of the lens frame 44 as shown in FIG. 2 when the lens frame 44 is viewed from the base plate 46 in the optical axis direction.

Figure 9:
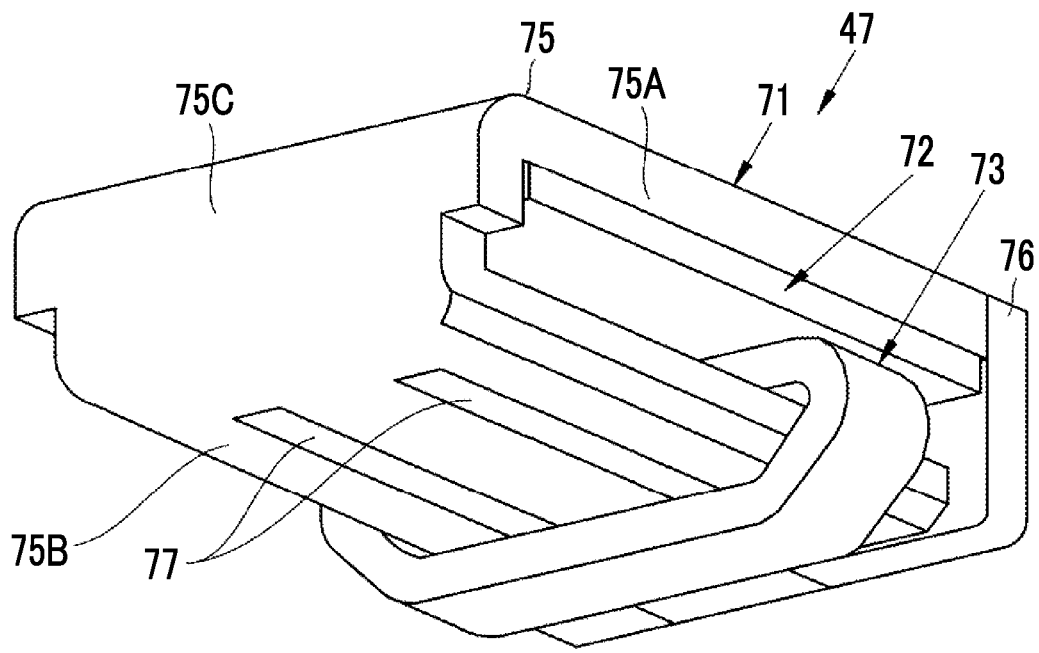
FIG. 9 is a perspective view of a VCM.
Figure 10:
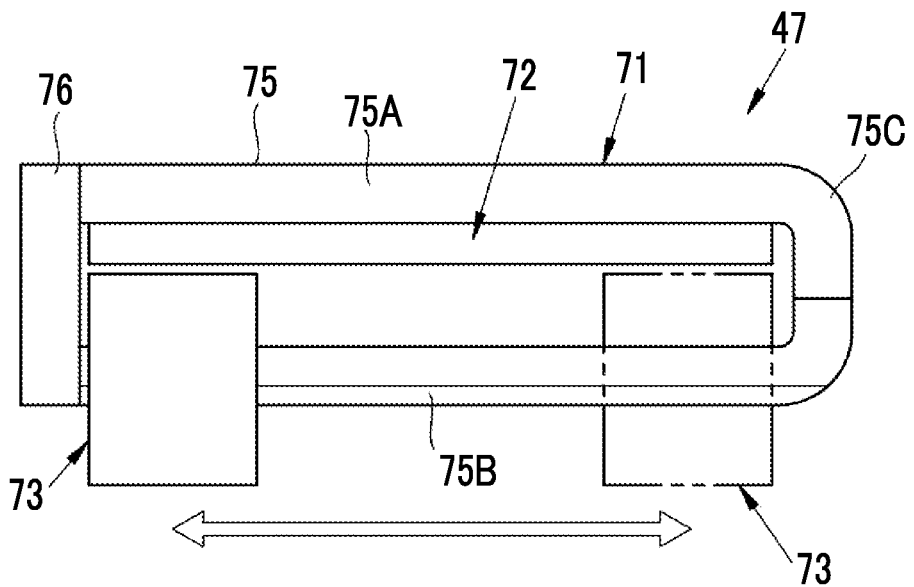
FIG. 10 is a side view of the VCM.

Each of the VCMs 47 comprises a yoke 71, a magnet 72, and a coil 73. The yoke 71 is made of a magnetic material, such as iron, and includes a yoke body 75 and a connecting plate 76 as shown in FIGS. 9 and 10. The yoke body 75 includes an outer yoke 75A and an inner yoke 75B that are provided in parallel with each other so as to face each other with a gap therebetween and are connected to each other by a connecting portion 75C, and is formed in a U shape when the yoke body 75 is viewed from a side surface. As shown in FIG. 2, a fitting groove 76A is formed in the middle of each of the upper and lower side portions of each connecting plate 76. Fitting-protruding pieces 75D of the yoke body 75 are fitted to the fitting grooves 76A, so that the yoke body 75 and the connecting plate 76 are connected to each other. The outer and inner yokes 75A and 75B are connected to each other by the connecting portion 75C and the connecting plate 76, so that a closed-loop magnetic circuit is formed. Magnetic flux crossing the coil 73 can be increased by the closed-loop magnetic circuit.

The outer yoke 75A functions as a magnet holding part, and the inner yoke 75B functions as a coil insertion part. The magnet 72 is fixed to the inner surface of the outer yoke 75A. Further, the coil 73 is movably inserted into the inner yoke 75B. Each of the outer and inner yokes 75A and 75B includes openings 77 for a reduction in weight.

As shown in FIG. 9, the coil 73 is an air-core coil that is formed by the winding of a strand, such as a copper wire. The coil 73 is formed in a trapezoid shape so as to surround the inner yoke 75B.

As shown in FIG. 10, the coil 73 is moved along the inner yoke 75B by the flow of a current in a magnetic field that is generated by the magnet 72. The position of the coil 73 shown by a solid line is a start end (reference position) in a moving direction, and the position of the coil 73 shown by a two-dot chain line is a terminal end in the moving direction.

Since the openings 77 are formed at the middle portion of the yoke body 75 in the moving direction of the coil, substantially the same thrust distribution in the moving direction of the coil as those at both end portions (the start end and the terminal end) can be made. Accordingly, thrust distribution can be maintained substantially constant in the moving direction of the coil. Since the openings 77 are formed at the outer and inner yokes 75A and 75B so that unnecessarily large thrust is suppressed as described above, the volume of the yoke 71 made of a material, which has high specific gravity, such as iron, can be reduced and the VCM 47 can be made light. In addition, necessary thrust can be ensured. The outer yoke 75A is fixed to the inner peripheral surface of the holding barrel 43 by mounting screws (not shown).

As shown in FIG. 8, coil-housing portions 44E are formed around the openings 44A and 44B of the lens frame 44. As shown in FIG. 3, the inner yokes 75B are inserted into the openings 44A and 44B. The coils 73 are housed in the coil-housing portions 44E. After the inner yokes 75B are inserted into the openings 44A and 44B, the fitting-protruding pieces 75D of the outer and inner yokes 75A and 75B are fitted to the fitting grooves 76A of the connecting plates 76. As a result, the outer yoke 75A, the inner yoke 75B, and the connecting plate 76 are integrated.

In a case where a current flows in the coil 73, the coil 73 is moved along the inner yoke 75B as shown in FIG. 10. The lens frame 44 holding the coils 73 is moved due to the movement of the coils 73. The first focus lens 22 is set to a predetermined position in the optical axis direction due to the movement of the lens frame 44, so that focusing is performed.

As shown in FIG. 3, the position sensor 48 for focusing detects the position of the lens frame 44 in the optical axis direction. The position sensor 48 for focusing includes a rod-like position detection magnet 48A and a magnetic sensor 48B. The position detection magnet 48A is mounted on the guide frame 50 of the lens frame 44. For example, a GMR element, which uses a giant magneto resistive effect (GMR), is used as the magnetic sensor 48B. The magnetic sensor 48B is mounted on the holding barrel 43. Accordingly, the magnetic sensor 48B detects the magnetism of the position detection magnet 48A and outputs a detection signal corresponding to the intensity of the magnetism.

An output signal of the magnetic sensor 48B is sent to the control unit 30 of the camera body 16 through a flexible substrate 48C (see FIG. 2) and the like. In the control unit 30, the position of the lens frame 44 in the optical axis direction is detected on the basis of a signal of the position sensor 48 for focusing and the first focus lens 22 is moved to a desired position by the first lens moving device 11 to perform focusing.

As shown in FIG. 1, the second lens moving device 12 has the same structure as the first lens moving device 11 except that the second focus lens 24 is mounted on the lens frame 44 instead of the first focus lens 22. For this reason, the same components will be denoted by the same reference numerals and the repeated description thereof will be omitted. A direction where the second lens moving device 12 is to be mounted and a direction where the first lens moving device 11 is to be mounted are opposite to each other in a front-back direction, but may be set to the same direction.

The stop mechanism 33 and the vibration-proof mechanism 34 are mounted between the first and second lens moving devices 11 and 12. The stop mechanism 33 includes a stop leaf blade 33A that is provided on the optical axis Ax. The diameter of a stop opening formed by the stop leaf blade 33A is increased or reduced, so that the amount of imaging light to be incident on the camera body 16 is adjusted.

The vibration-proof mechanism 34 displaces the blur-correction lens 23 in an XY plane in a direction, where blur of an image is canceled, by an X-direction VCM and a Y-direction VCM (not shown). Accordingly, image blur is corrected.

Next, the action of the imaging apparatus 14 of this embodiment will be described. In a case in which imaging is started by a release operation, the first and second lens moving devices 11 and 12 are operated to move the first and second focus lenses 22 and 24 in the optical axis direction and focusing control is performed. Since the focusing control of the plurality of focus lenses 22 and 24 is performed by the first and second lens moving devices 11 and 12 as described above, a lens-moving distance is distributed. Accordingly, quick focusing can be performed. Particularly, since the plurality of focus lenses 22 and 24 are moved, quick and accurate focusing can be performed in macro imaging. Further, in a case in which the shake of the imaging apparatus 14 is detected, the vibration-proof mechanism 34 is operated and moves the blur-correction lens 23 in the XY plane. Accordingly, image blur is corrected.

In a case where the VCMs 47 are driven, the lens frame 44 is moved in the optical axis direction through the coils 73. The movement of the lens frame 44 is performed while the rolling bodies 49A to 49C are in contact with the first and second rails 51 and 52 provided on the lens frame 44. Further, the rolling bodies 49A to 49C are biased by the biasing mechanism 54 and the third rail 53 so as to be in contact with the first and second rails 51 and 52. Accordingly, the first and second rails 51 and 52 are sandwiched in the vertical direction by the first rolling body 49A and the second rolling bodies 49B and 49C. Therefore, gaps for sliding do not need to be provided between the first and second rails 51 and 52 and the first and second rolling bodies 49A to 49C that guide the lens frame 44. Accordingly, the lens frame 44 can be smoothly moved in the optical axis direction without rattling.

Figure 16:
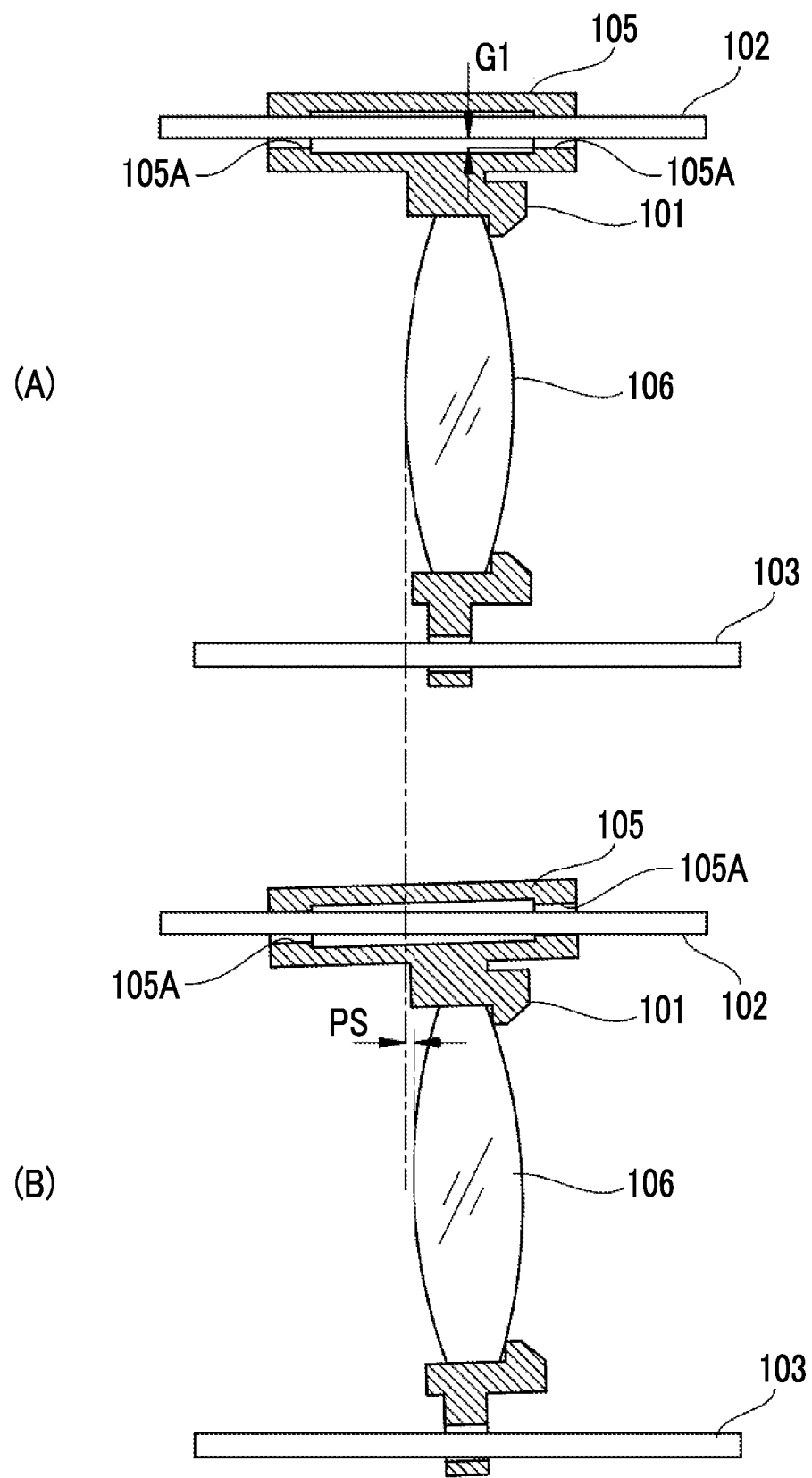
FIG. 16 is a cross-sectional view showing the position shift of a lens that is caused by the fitting rattling of a lens guide device in the related art.

Further, since the amount PS of shift in the stop position of the lens, which is caused by an inclination of the lens frame 101 at the time of movement of the lens frame 101 as in the related art shown in (B) of FIG. 16, is not generated, the position of the first focus lens 22 is not shifted on the optical axis in a state immediately after movement and in a subsequent stop state. Accordingly, the first focus lens 22 can be accurately stopped at a target position. Therefore, focusing can be accurately performed.

Since the first rolling body 49A can be positioned between the second rolling bodies 49B and 49C by the first restricting protrusions 61 and the second restricting protrusion 62 when the first rolling body 49A and the second rolling bodies 49B and 49C are viewed in the vertical direction, the lens frame 44 can be efficiently guided in the optical axis direction by the three rolling bodies 49A to 49C.

Initialization for returning the lens frame 44 to the reference position, which is one end of the predetermined range, is performed by the lens driving mechanism 42, so that the first rolling body 49A can be locked by the first restricting protrusions 61 and the second rolling bodies 49B and 49C can be locked by the second restricting protrusion 62 through the initialization. Since the rolling bodies 49A to 49C roll on the respective rails 51 to 53 and the biasing plate 67, the relative positions of the respective rolling bodies 49A to 49C on the respective rails 51 to 53 and the biasing plate 67 are not changed originally. However, even in a case where the positions of the respective rolling bodies 49A to 49C on the rails 51 to 53 and the biasing plate 67 are shifted due to fall or other impacts, the respective rolling bodies 49A to 49C can be reliably returned to the reference positions by the initialization.

A sphere made of metal or ceramic is used as the rolling body, but a sphere made of a hard synthetic resin, a sphere, which is made of a synthetic resin and of which the surface is subjected to hard plating, and the like can be used as the rolling body other than this. Since a sphere made of ceramic is lightweight and has an advantage of not being affected by a magnetic force, the sphere made of ceramic is more preferably used. Further, in the case of a sphere made of metal, particularly, in the case of a sphere made of a magnetic material responding to a magnetic force, there is a concern that the drive performance of the sphere may deteriorate due to the influence of the magnetic field of the magnet. For this reason, a sphere made of non-magnetic stainless steel (SUS) is used. The sphere made of a magnetic material is used in a state where a distance between the magnet and the sphere is sufficiently ensured and an influence of a magnetic field is removed or reduced. Further, it is preferable that the biasing plate 67, the guide shafts 51A, 51B, 52A, 52B, 53A, and 53B, and the stoppers 60 made of metal other than the rolling bodies are also made of non-magnetic stainless steel (SUS), a hard synthetic resin, a synthetic resin of which the surface is subjected to hard plating, or the like.

Focusing control is performed using the two lens moving devices 11 and 12, but focusing control may be performed using one lens moving device 11.

First Modification Example

Figure 11:
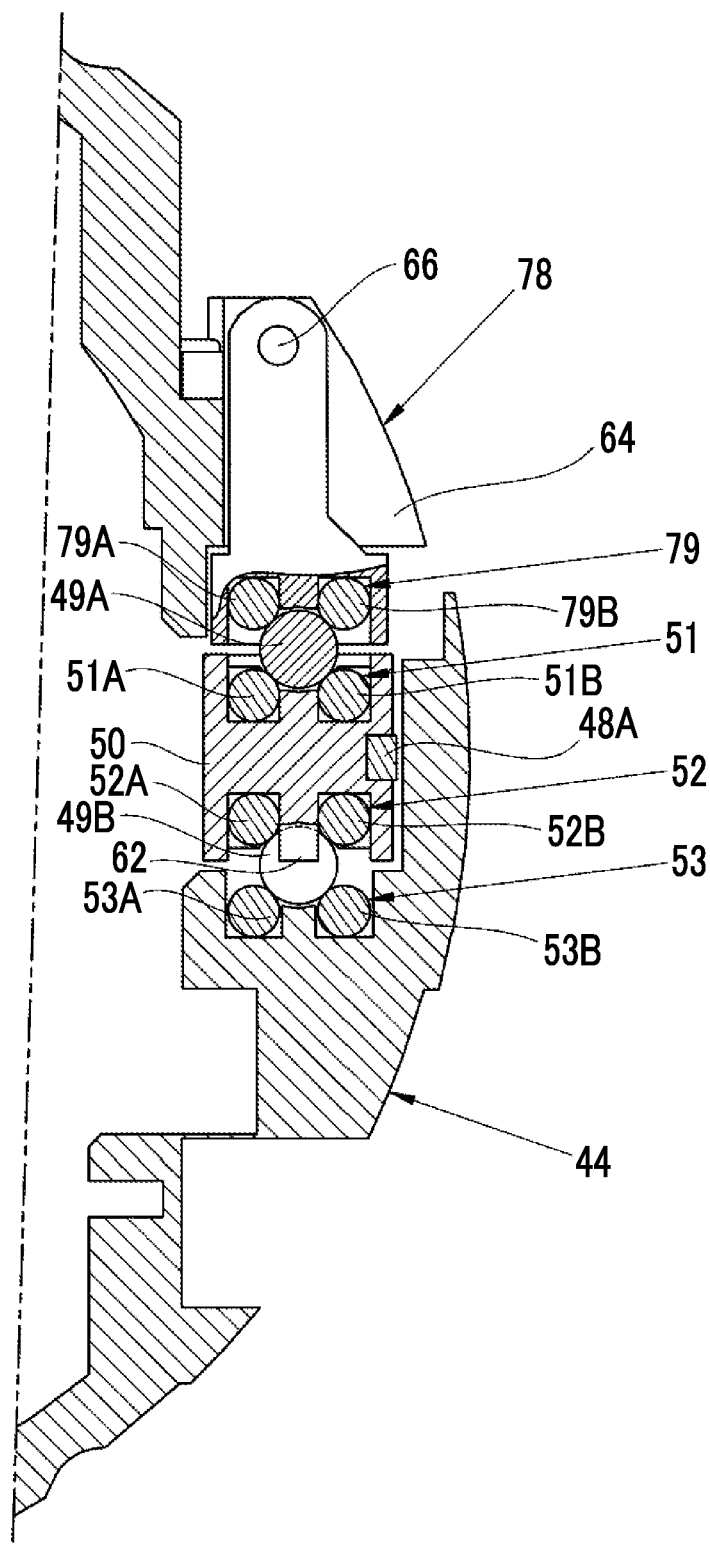
FIG. 11 is a cross-sectional view showing a first modification example of the biasing mechanism that uses a guide rail instead of a biasing plate.

As shown in FIG. 6, in the first embodiment, the first rolling body 49A is held so as to be sandwiched by the biasing plate 67 formed of a flat plate and the first rail 51. On the other hand, the second rolling bodies 49B and 49C are sandwiched by the second and third rails 52 and 53. For this reason, since the first rolling body 49A and the second rolling bodies 49B and 49C have the same diameter but have different contact positions, the rolling diameter of the first rolling body 49A is different from the rolling diameters of the second rolling bodies 49B and 49C. Accordingly, for example, the first rolling body 49A not only rolls but also slips. A biasing mechanism 78, which includes a guide rail 79 formed of a pair of guide shafts 79A and 79B instead of the biasing plate 67, is used to avoid this in the first modification example shown in FIG. 11.

In this first modification example, the first rolling body 49A and the second rolling bodies 49B and 49C have the same rolling diameter. Accordingly, for example, the slide of the first rolling body 49A is suppressed, so that the lens frame 44 can be more smoothly moved. In the description of each modification example and each embodiment, the same components as those of the first embodiment will be denoted by the same reference numerals as those of the first embodiment and the repeated description thereof will be omitted. Further, not only one first rolling body 49A may be used but also two first rolling bodies 49A may be used in modification examples and other embodiments. In this case, it is preferable that a second restricting protrusion 62 is provided in the first rail 51 or the guide rail 79 at an intermediate position in the first direction and returns each of the rolling bodies 49A to 49C to an initial position. In a case where two first rolling bodies 49A are used, the two first rolling bodies 49A do not need to be necessarily provided between two second rolling bodies 49B and 49C.

Second Modification Example

Figure 12:
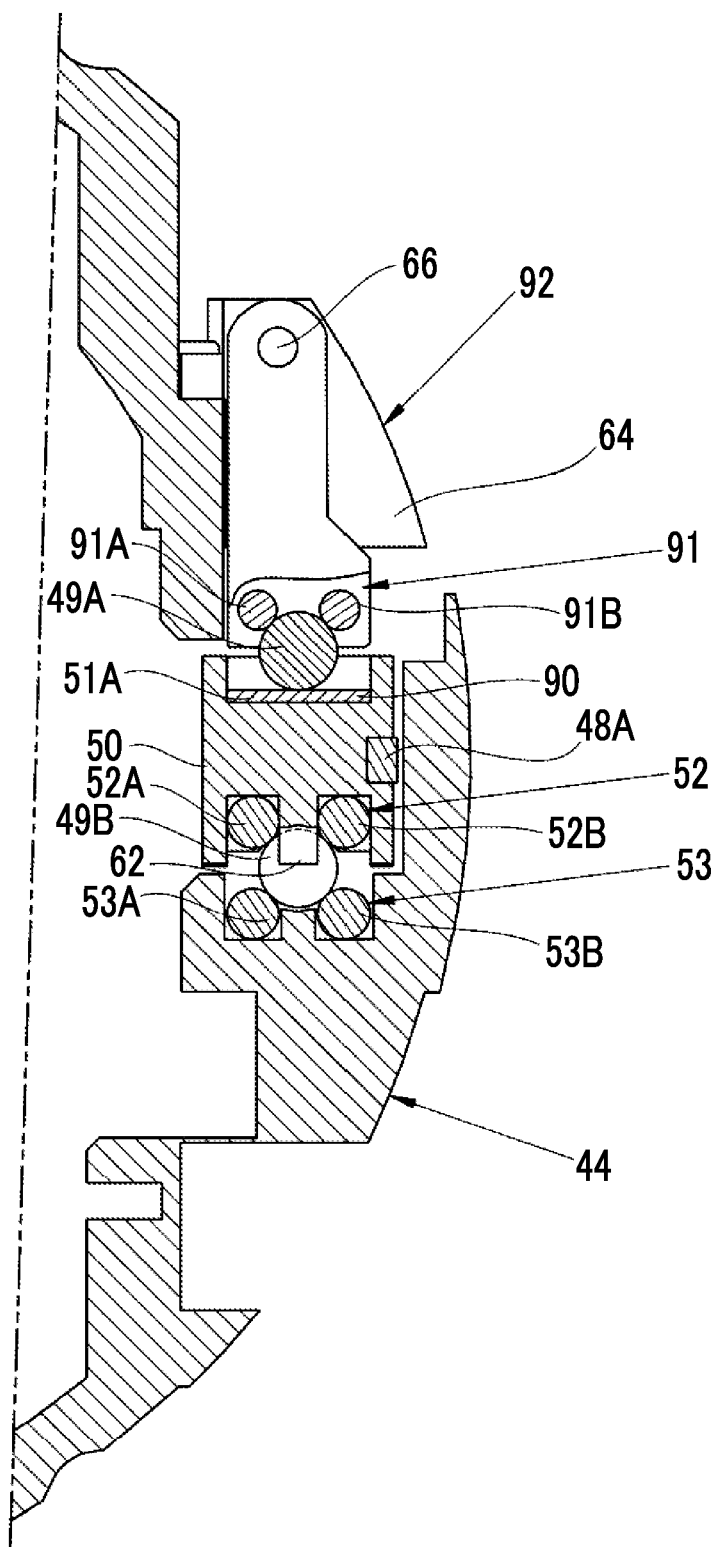
FIG. 12 is a cross-sectional view showing a second modification example of the biasing mechanism where a biasing plate and a first rail of a first embodiment are disposed so as to be vertically inverted.

As shown in FIG. 6, in the first embodiment, the first rolling body 49A is held so as to be sandwiched by the first rail 51 and the biasing plate 67 formed of a flat plate. In contrast, in a second modification example shown in FIG. 12, the first rail 51 (see FIG. 6) and the biasing plate 67 (see FIG. 6) of the first embodiment are disposed so as to be vertically inverted, a biasing plate 90 is used as a first guide member, and a first rail 91 is used as a fourth guide member. The first rail 91 is formed of two parallel guide shafts 91A and 91B. The first rail 91 is biased downward by a biasing mechanism 92. The biasing mechanism 92 has substantially the same structure as the biasing mechanism 54 of the first embodiment. Even in this case, as in the first embodiment, the lens frame 44 can be smoothly moved in the optical axis direction without rattling. Accordingly, the first focus lens 22 can be accurately stopped at a target position, so that focusing can be accurately performed.

In the first embodiment and the first and second modification examples, the first rolling bodies 49A are biased toward the second rolling bodies 49B and 49C by the first biasing mechanisms 54 and 78. However, instead of or in addition to this, the second rolling bodies 49B and 49C may be biased toward the first rolling body 49A by a second biasing mechanism. Although not shown, the second biasing mechanism has the same structure as the first biasing mechanisms 54 and 78. Further, each of the biasing mechanism 54 and 78 is provided in the holding barrel 43, but may be provided in the guide frame 50 instead of this. Although not shown, a guide member with a guide groove may be used instead of the biasing plates 67 and 90 as a flat plate-like guide member. The guide member with a guide groove includes a guide groove that is formed in the first direction on the guide surface of a guide block having the shape of a rectangular parallelepiped and has a V-shaped cross section. Rolling bodies are movably put in the guide groove.

Second Embodiment

Figure 13:
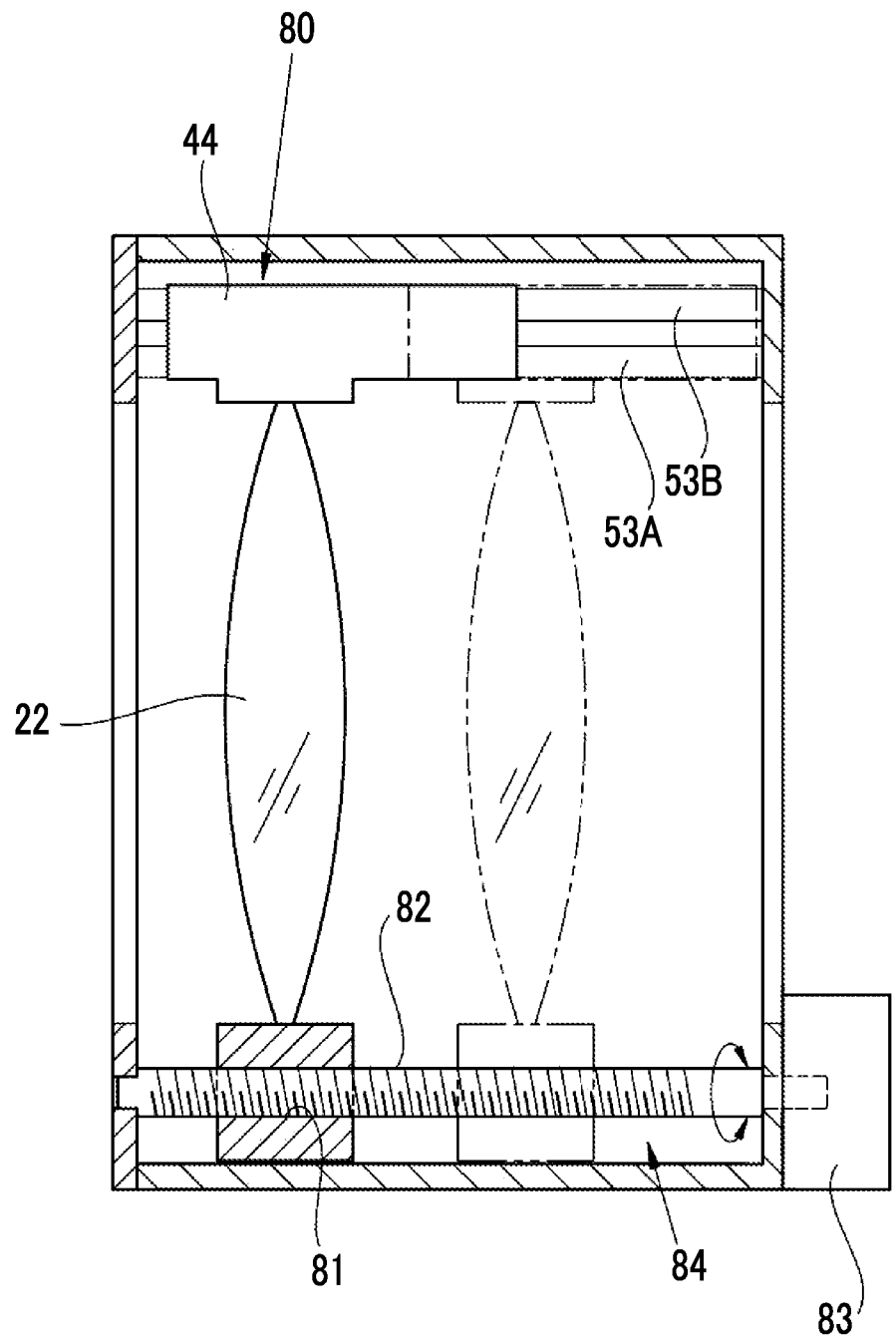
FIG. 13 is a cross-sectional view of a lens moving device of a second embodiment that uses a stepping motor instead of a VCM.

The lens driving mechanism 42 includes the VCMs 47 in the first embodiment, but a lens driving mechanism 84 may include a female screw portion 81, a screw rod 82, and a stepping motor 83 as in a lens moving device 80 of the second embodiment shown in FIG. 13 instead of this. In this case, the lens frame 44 is provided with the female screw portion 81 instead of the guide groove 44D (see FIG. 2) of the first embodiment. Further, the screw rod 82 is used instead of the guide rod 56 (see FIG. 2), and the screw rod 82 is screwed with the female screw portion 81. Furthermore, the screw rod 82 is rotated by the stepping motor 83. The screw rod 82 is rotated in a normal direction or a reverse direction, so that the lens frame 44 including the female screw portion 81 can be accurately positioned at a predetermined position in the optical axis direction.

Third Embodiment

Figure 14:
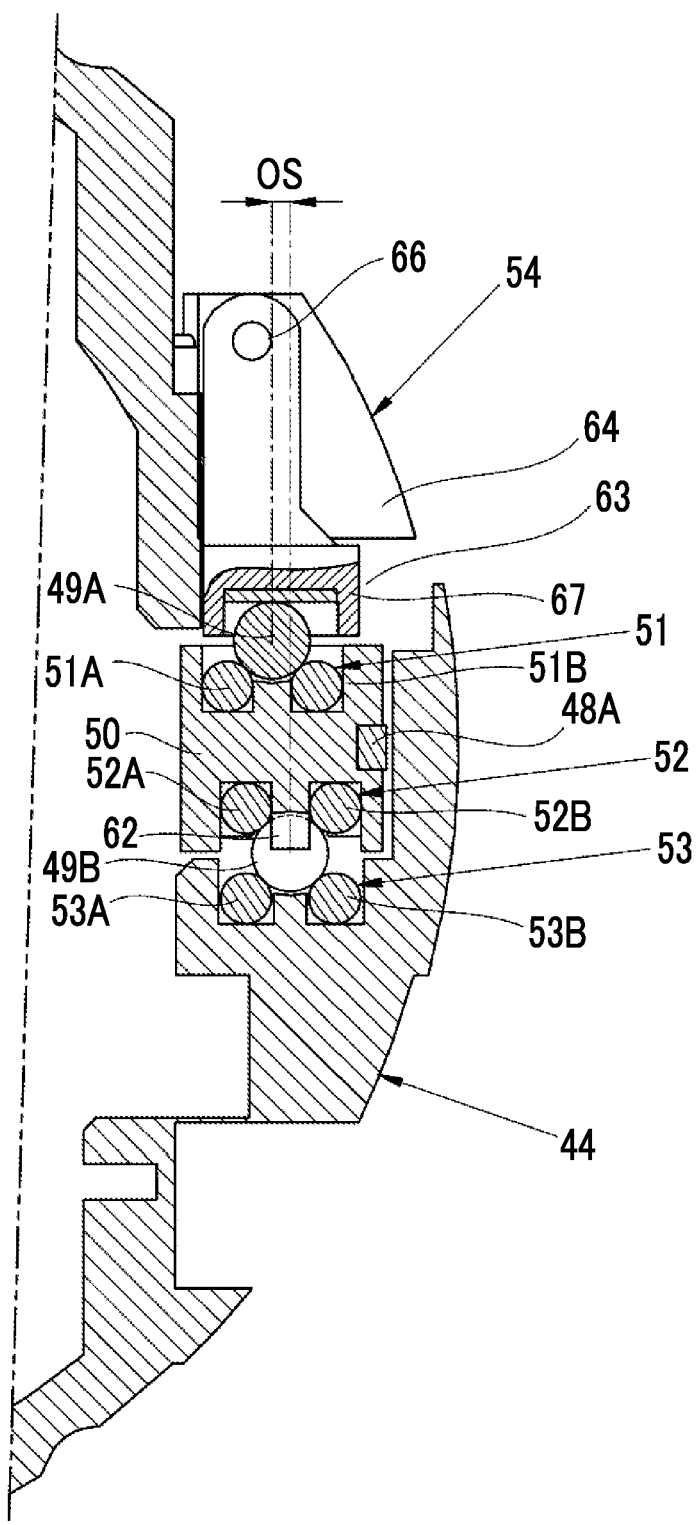
FIG. 14 is a cross-sectional view of a lens moving device of a third embodiment where a first rolling body is disposed so as to be eccentric to a guide rod from a second rolling body, taken along a line corresponding to line VI-VI of FIG. 5.

In a third embodiment shown in FIG. 14, a first rolling body 49A, a first rail 51, and a biasing mechanism 54 are provided so as to be eccentric to the guide rod 56 (see FIG.

2). For example, when the first rail 51, the biasing mechanism 54, and the first rolling body 49A are viewed in the optical axis direction, the first rail 51, the biasing mechanism 54, and the first rolling body 49A are disposed so as to be eccentric to the guide rod 56 from a vertical line, which passes through the second rolling bodies 49B and 49C sandwiched by the second and third rails 52 and 53, by an eccentricity OS. Accordingly, as shown in FIG. 8, torque corresponding to a biasing force generated by the biasing mechanism 54 can be applied toward the guide rod 56 by an eccentricity OS while a line passing through the centers of the second rolling bodies 49B and 49C is used as the center of rotation. Since this torque is applied, the guide rod 56 is in close contact with one side of the guide groove 44D within the fitting rattling of the guide rod 56 in the guide groove 44D. Accordingly, fitting rattling can be removed. Therefore, the position shift of the first focus lens 22 in the XY plane, which is caused by fitting rattling, can be removed.

Eccentric biasing to the first rolling body 49A by the biasing mechanism 54 may be directed to the left side opposite to the guide rod 56 on the contrary to FIG. 14. Since fitting rattling can be removed by eccentric biasing even in this case, the position shift of the first focus lens 22 can be removed.

Figure 15:
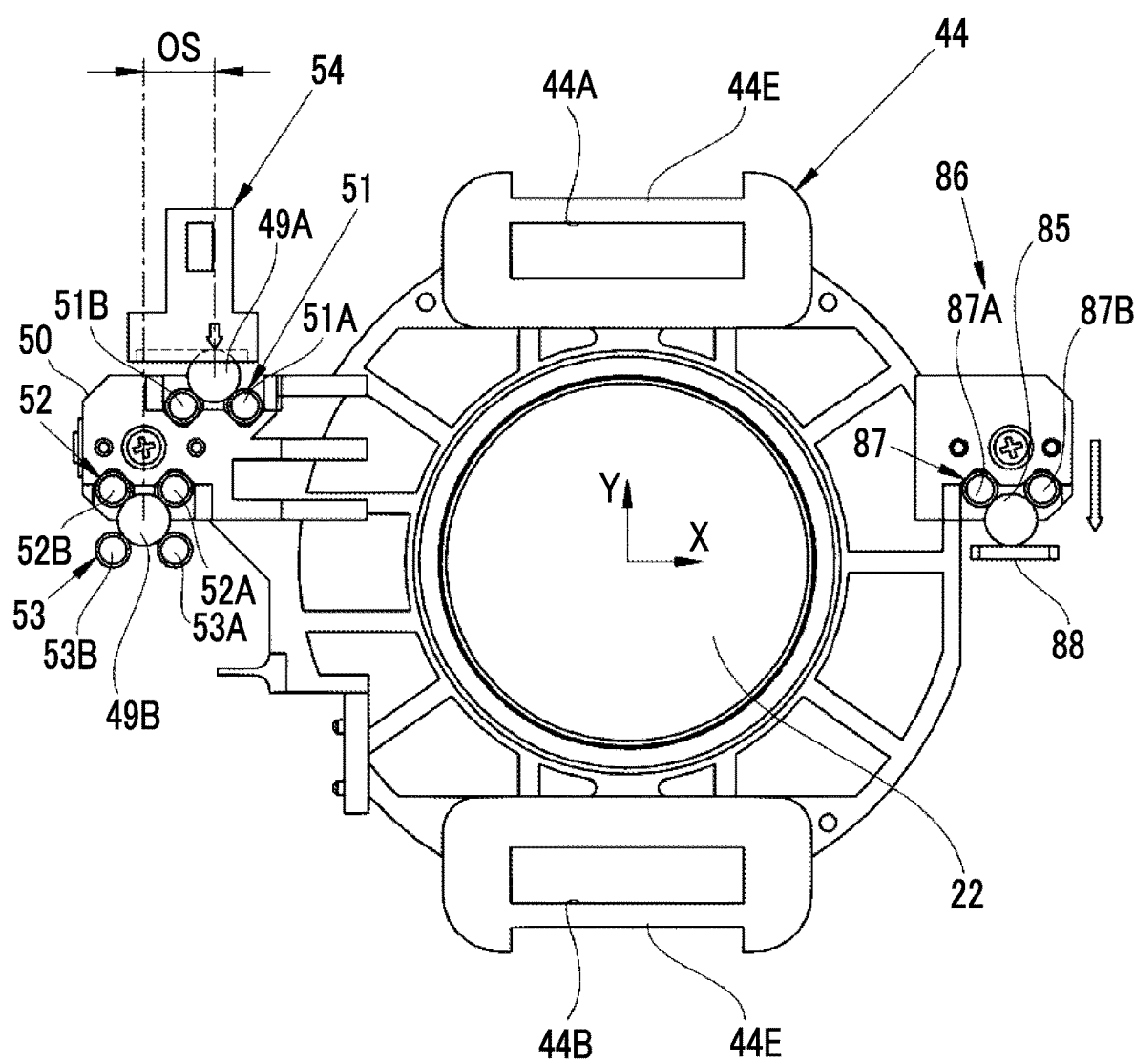
FIG. 15 is a front view showing a third modification example of the third embodiment that uses a second guide mechanism including a third rolling body instead of a guide rod.

In the respective embodiments, the rotation of the lens frame 44 in the XY plane orthogonal to the optical axis direction is prevented by the engagement between the guide groove 44D and the guide rod 56 as shown in FIG. 2. In a modification example (third modification example) of the third embodiment shown in FIG. 15, the rotation of the lens frame 44 in the XY plane is restricted by a second guide mechanism 86 using third rolling bodies 85. In this case, since the lens frame 44 is guided in the optical axis direction by the rolling of the third rolling bodies 85, the movement resistance of the lens frame 44 is lower than that in the case of the slide of the guide groove 44D on the guide rod 56. Accordingly, the lens frame 44 can be more smoothly guided.

The second guide mechanism 86 is provided instead of the guide groove 44D (see FIG. 2) of the lens frame 44, and includes the third rolling bodies 85, a fifth rail 87 as a fifth guide member, and a guide plate 88 as a support member. The fifth rail 87 comprises a pair of guide shafts 87A and 87B as in the case of the second rail 52. The guide plate 88 is provided in the holding barrel 43. A rail, which is formed of a pair of guide shafts as in the case of the third rail 53, may be used as a support member instead of the guide plate 88.

The lens moving devices 11 and 12 and the lens guide device 10 according to the embodiments of the invention are used for focusing control, and are also used for the movement of lenses of a zoom device or other optical devices.

EXPLANATION OF REFERENCES

10: lens guide device
11: first lens moving device
12: second lens moving device
14: imaging apparatus
15: lens unit
16: camera body
17: imaging element
18: connector
19: optical system
20: lens barrel member
21: first lens
22: first focus lens
23: blur-correction lens
24: second focus lens
25: fifth lens
30: control unit
33: stop mechanism
33A: stop leaf blade
34: vibration-proof mechanism
38: focus ring
41: mounting screw
42: lens driving mechanism
43: holding barrel
44: lens frame
44A: opening
44B: opening
44D: guide groove
44E: coil-housing portion
45: guide mechanism
46: base plate
47: VCM
48: position sensor for focusing
48A: position detection magnet
48B: magnetic sensor
48C: flexible substrate
49A: first rolling body
49B, 49C: second rolling body
50: guide frame
51: first rail
51A, 51B: guide shaft
52: second rail
52A, 52B: guide shaft
53: third rail
53A, 53B: guide shaft
54: biasing mechanism
56: guide rod
60: stopper
61: first restricting protrusion
62: second restricting protrusion
63: biasing frame
63A: mounting piece
63B: mounting hole
63D: housing groove
63E: guide hole
64: mounting frame
64A: long hole
64B: spring-housing hole
64C: guide shaft
65: coil spring
66: mounting shaft
67: biasing plate
68: mounting screw
71: yoke
72: magnet
73: coil
75: yoke body
75A: outer yoke
75B: inner yoke
75C: connecting portion
75D: fitting-protruding piece
76: connecting plate
76A: fitting groove
77: opening
78: biasing mechanism
79: guide rail
79A, 79B: guide shaft
80: lens moving device
81: female screw portion 82: screw rod
83: stepping motor
84: lens driving mechanism
85: third rolling body
86: second guide mechanism
87: fifth rail
87A, 87B: guide shaft
88: guide plate
90: biasing plate
91: first rail
91A, 91B: guide shaft
101: lens frame
A1: arrow
Ax: optical axis
OS: eccentricity
PS: amount of shift

What is claimed is:

1. A lens guide device comprising:
a lens frame that holds a lens;
a first guide member that is provided on the lens frame in a first direction parallel to an optical axis of the lens;
a first rolling body that is moved while being in contact with the first guide member;
a second guide member that is parallel to the first guide member and is provided on the lens frame on a side opposite to the first rolling body so as to be close to the first guide member;
a second rolling body that is moved while being in contact with the second guide member;
a third guide member that supports the second rolling body so as to allow the second rolling body to be movable in the first direction and is parallel to the second guide member;
a fourth guide member that supports the first rolling body so as to allow the first rolling body to be movable in the first direction and is parallel to the first guide member; and
a biasing mechanism that biases one of the first and second rolling bodies toward the other of the first and second rolling bodies,
wherein at least one of the first guide member, the second guide member, the third guide member, or the fourth guide member is a flat plate guide member or a guide member with a guide groove, and each of the other guide members is two parallel guide shafts,
wherein the first rolling body is at least one sphere and the second rolling body is two spheres that are provided so as to be spaced from each other in the first direction, and wherein the lens guide device further comprises:
a first restricting protrusion that restricts the movement of the first rolling body beyond a predetermined range on the first guide member;
a second restricting protrusion that is provided between the two spheres and restricts the movement of the second rolling body beyond a predetermined range on the second guide member;
a holding barrel in which the biasing mechanism and the third guide member are provided and which holds the lens frame therein;
a guide rod that is provided in the holding barrel in the first direction;
a guide groove that is provided on the lens frame, is in sliding contact with the guide rod, and guides the lens frame so as to allow the lens frame to be movable in the first direction; and
the first rolling body is provided so as to be eccentric to the guide rod or a side opposite to the guide rod from the second rolling body.

2. A lens moving device comprising:
the lens guide device according to claim 1; and
a lens driving mechanism that is provided in the holding barrel and moves the lens frame in an optical axis direction.

3. The lens moving device according to claim 2,
wherein the lens driving mechanism is a voice coil motor or a stepping motor that includes a screw rod screwed with the lens frame.

4. The lens moving device according to claim 3,
wherein the lens driving mechanism performs initialization for returning the lens frame to a reference position that is one end of the predetermined range.

5. An imaging apparatus comprising:
an imaging unit; and
the lens moving device according to claim 2 that forms an object image on the imaging unit.

6. A lens guide device comprising:
a lens frame that holds a lens;
a first guide member that is provided on the lens frame in a first direction parallel to an optical axis of the lens;
a first rolling body that is moved while being in contact with the first guide member;
a second guide member that is parallel to the first guide member and is provided on the lens frame on a side opposite to the first rolling body so as to be close to the first guide member;
a second rolling body that is moved while being in contact with the second guide member;
a third guide member that supports the second rolling body so as to allow the second rolling body to be movable in the first direction and is parallel to the second guide member;
a fourth guide member that supports the first rolling body so as to allow the first rolling body to be movable in the first direction and is parallel to the first guide member; and
a biasing mechanism that biases one of the first and second rolling bodies toward the other of the first and second rolling bodies,
wherein at least one of the first guide member, the second guide member, the third guide member, or the fourth guide member is a flat plate guide member or a guide member with a guide groove, and each of the other guide members is two parallel guide shafts,
wherein each of the first rolling body and the second rolling body is two spheres that are provided so as to be spaced from each other in the first direction, and wherein the lens guide device further comprises:
restricting protrusions that protrude from intermediate positions of the first and second guide members in the first direction, are provided between the two spheres, respectively, and restrict the movement of the respective spheres beyond predetermined ranges in the first direction;
a holding barrel in which the biasing mechanism and the third guide member are provided and which holds the lens frame therein;
a guide rod that is provided in the holding barrel in the first direction;
a guide groove that is provided on the lens frame, is in sliding contact with the guide rod, and guides the lens frame so as to allow the lens frame to be movable in the first direction; and the first rolling body is provided so as to be eccentric to the guide rode or a side opposite to the guide rod from the second rolling body.

7. A lens moving device comprising:
the lens guide device according to claim 6; and
a lens driving mechanism that is provided in the holding barrel and moves the lens frame in an optical axis direction.

8. The lens moving device according to claim 7,
wherein the lens driving mechanism is a voice coil motor or a stepping motor that includes a screw rod screwed with the lens frame.

\* \* \* \* \*